United States Patent
Zhao et al.

(10) Patent No.: US 9,086,189 B2
(45) Date of Patent: Jul. 21, 2015

(54) SYSTEM AND METHOD FOR A PRESSURE SIGNAL LINEARIZATION TRANSFER FUNCTION

(75) Inventors: Xiao Ming Zhao, Windsor (CA); Renato Colja, Windsor (CA); Horia Blendea, LaSalle (CA)

(73) Assignee: LEGGETT & PLATT CANADA CO., Halifax, Nova Scotia (CA)

( * ) Notice: Subject to any disclaimer, the term of this patent is extended or adjusted under 35 U.S.C. 154(b) by 523 days.

(21) Appl. No.: 13/473,070

(22) Filed: May 16, 2012

(65) Prior Publication Data
US 2013/0306161 A1  Nov. 21, 2013

(51) Int. Cl.
*F17D 3/00* (2006.01)

(52) U.S. Cl.
CPC ........................................ *F17D 3/00* (2013.01)

(58) Field of Classification Search
CPC .... A47C 27/08; A47C 27/081; A47C 27/082; A47C 27/083; A47C 4/54; F17D 3/00
USPC ...................... 700/14, 46, 281, 282, 283, 301
See application file for complete search history.

(56) References Cited

U.S. PATENT DOCUMENTS

| | | | |
|---|---|---|---|
| 4,634,179 A | 1/1987 | Hashimoto et al. | |
| 4,782,879 A * | 11/1988 | Le Chatelier et al. | ........ 152/417 |
| 4,833,614 A | 5/1989 | Saitoh et al. | |
| 4,889,132 A | 12/1989 | Hutcheson et al. | |
| 5,005,904 A | 4/1991 | Clemens et al. | |
| 5,637,076 A | 6/1997 | Hazard et al. | |
| 5,967,608 A | 10/1999 | Van Sickle | |
| 6,014,784 A | 1/2000 | Taylor et al. | |
| 6,058,341 A | 5/2000 | Myers et al. | |
| 6,216,300 B1 | 4/2001 | Hannagan | |
| 6,544,203 B2 | 4/2003 | Hazard | |
| 6,674,024 B2 | 1/2004 | Cech et al. | |
| 7,267,404 B2 | 9/2007 | Kern et al. | |
| 7,828,379 B2 | 11/2010 | Sugiyama | |
| 7,841,663 B2 | 11/2010 | Nathan | |
| 2010/0132124 A1 | 6/2010 | Liu et al. | |
| 2010/0308846 A1 | 12/2010 | Camus | |
| 2012/0086249 A1* | 4/2012 | Hotary et al. | ............... 297/284.3 |
| 2012/0143108 A1* | 6/2012 | Bocsanyi et al. | ............. 601/148 |
| 2014/0026327 A1* | 1/2014 | Taylor | ................................ 5/713 |

FOREIGN PATENT DOCUMENTS

GB         2168893         7/1986

OTHER PUBLICATIONS

PCT/CA2012/000463 International Search Report and Written Opinion date mailed Feb. 6, 2013 (6 pages).

* cited by examiner

*Primary Examiner* — Mohammad Ali
*Assistant Examiner* — Nathan Laughlin
(74) *Attorney, Agent, or Firm* — Michael Best & Friedrich LLP (57) ABSTRACT

A method for operating a pneumatic lumbar support between a deflated position and an inflated position. The method includes inflating a bladder of the pneumatic lumbar support; sensing a pressure within the bladder using a pressure sensor; producing an inflation output signal from the pressure sensor, wherein the inflation output signal is a function of time; and converting the inflation output signal using an inflation-deflation transfer function.

20 Claims, 11 Drawing Sheets

SYSTEM AND METHOD FOR A PRESSURE SIGNAL LINEARIZATION TRANSFER FUNCTION

BACKGROUND

The present invention relates to pressure measurements for an inflatable lumbar support and methods and systems for transforming the pressure measurements.

Lumbar supports having inflatable bladders provide a convenient mechanism for adjusting the position of the lumbar support by inflating and deflating the bladder. Inflatable lumbar supports generally include a pressure sensor on the bladder to track the inflation and deflation. However, while the relationship between bladder pressure and pressure sensor output voltage is linear (see FIG. 1), the relationship between bladder pressure and inflation/deflation time is not linear (see FIG. 2). Hence, the relationship between the lumbar travel time and pressure sensor voltage output is nonlinear. It would be useful to provide a user with an approximately linear display of lumbar travel distance, e.g. so that the user can more accurately adjust the lumbar support to their liking.

SUMMARY

In one embodiment the invention provides a method for operating a pneumatic lumbar support between a deflated position and an inflated position. The method includes inflating (or deflating) a bladder of the pneumatic lumbar support; sensing a pressure within the bladder using a pressure sensor; producing an inflation (or deflating) output signal from the pressure sensor, wherein the inflation (or deflating) output signal is a function of time; and converting the inflation (or deflating) output signal using an inflation-deflation transfer function.

Other aspects of the invention will become apparent by consideration of the detailed description and accompanying drawings.

DETAILED DESCRIPTION

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways.

Figure 1:
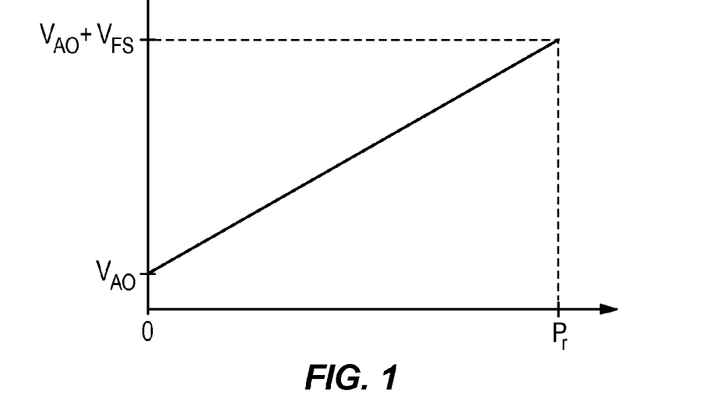
FIG. 1 shows a graph of the relationship between lumbar support bladder pressure and pressure sensor output voltage.
Figure 2:
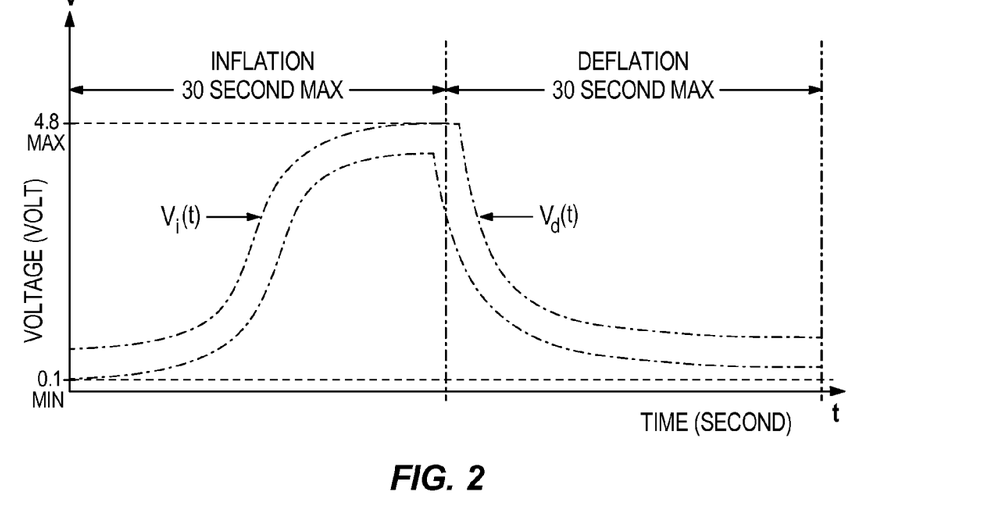
FIG. 2 shows a graph of the relationship between actual lumbar support bladder pressure sensor output voltage and inflation and deflation time.

As shown in FIG. 1, the relationship between bladder pressure and pressure sensor output voltage is linear. In contrast, the relationship between bladder pressure and inflation/deflation time is not linear (FIG. 2). Hence, the relationship between lumbar travel time and pressure sensor voltage output is nonlinear. To obtain the pressure sensor output vs. time as a linear function, a sensor output voltage transformation device needs to be added into the output line of the pressure sensor. It should be noted that the inflation sensor output function $V_i(t)$ and the deflation sensor output function $V_d(t)$ are very different from one another (e.g. see FIG. 2) and furthermore will vary due to factors such as environmental pressure, ambient temperature, power supply voltage, etc.

In one embodiment, the invention includes a vehicle seat having an inflatable bladder therein (e.g. as part of a support such as a lumbar support) includes an inflation mechanism (e.g. an air pump) and a pressure sensor attached to the inflatable bladder. The pressure sensor produces a voltage that is linearly proportional to the pressure in the bladder. The vehicle seat has a controller associated therewith (e.g. in the seat or in another part of the vehicle) which receives as an input the voltage from the pressure sensor and has as an output a control signal to control the inflation and deflation of the bladder. The controller can include a microprocessor, input and output capabilities, memory, and data storage, all of which are operably linked together. The controller executes commands (e.g. using the microprocessor) to carry out the methods described herein and, in various embodiments, includes a transfer function module in accordance with the present disclosure for providing a linear or approximately linear relationship between bladder inflation (or deflation) time and pressure. In some embodiments, the controller includes or communicates with computer-readable media which includes software instructions for operating the controller, including the transfer function module of the controller. The controller may be linked (e.g. via its input and output) to user displays and controls which provide the user (e.g. vehicle driver) with information about the bladder position and permit the user to adjust the bladder.

Figure 14:
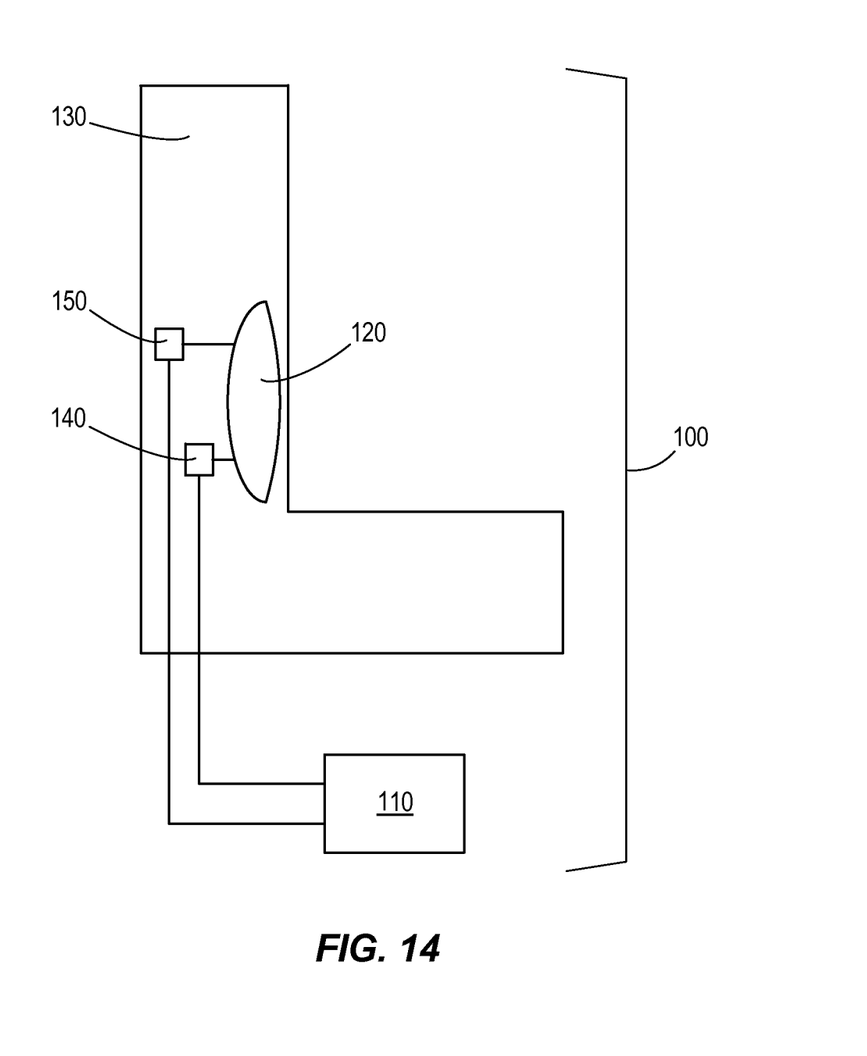
FIG. 14 shows a diagram of a system for carrying out the methods disclosed herein.

In various embodiments, the invention includes methods of controlling an inflatable bladder for a seat support, including implementation of a linear inflation-deflation transfer function as disclosed herein. In other embodiments, the invention includes a system 100 for controlling an inflatable seat support bladder, the system including a controller 110, an inflatable bladder 120, a seat 130 (e.g. for a vehicle), an inflation device 140, and a pressure sensor 150 attached to the bladder 120, where the controller 110 includes a transfer function module which implements a linear inflation-deflation transfer function as disclosed herein (FIG. 14).

Figure 3:
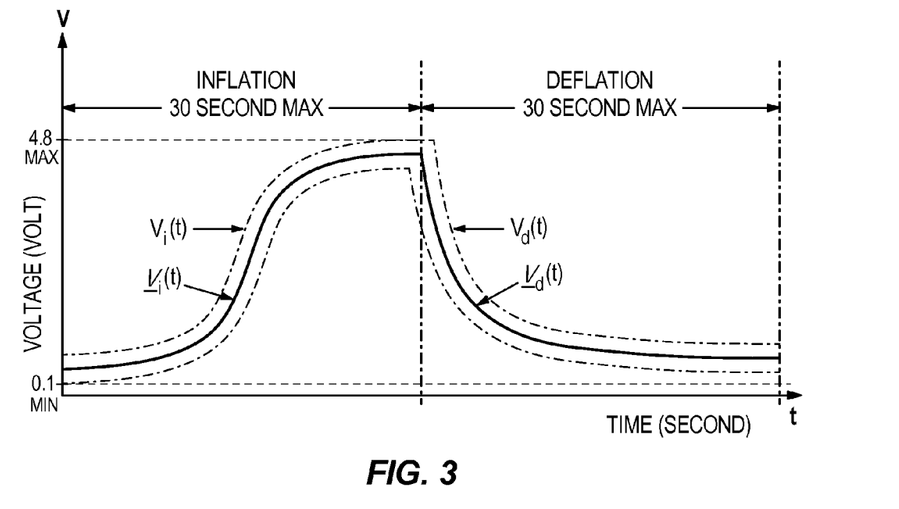
FIG. 3 shows a graph of pneumatic pressure sensor estimated or filtered output.

FIG. 3 shows a graph of pneumatic pressure sensor estimated output. The inflation sensor output estimated function is designated as $\underline{V}_i(t)$. The deflation sensor output estimated function is designated as $\underline{V}_d(t)$ and in one embodiment is expressed as $$\underline{V}_d(t)=ct^k \cdot \log_{10}\underline{V}_d(t)=\log_{10}C+k\log_{10}t => Z=kY+D,$$
$$\text{where } Z=\log_{10}\underline{V}_d(t), Y=\log_{10}t, D=\log_{10}C$$

Figure 4:
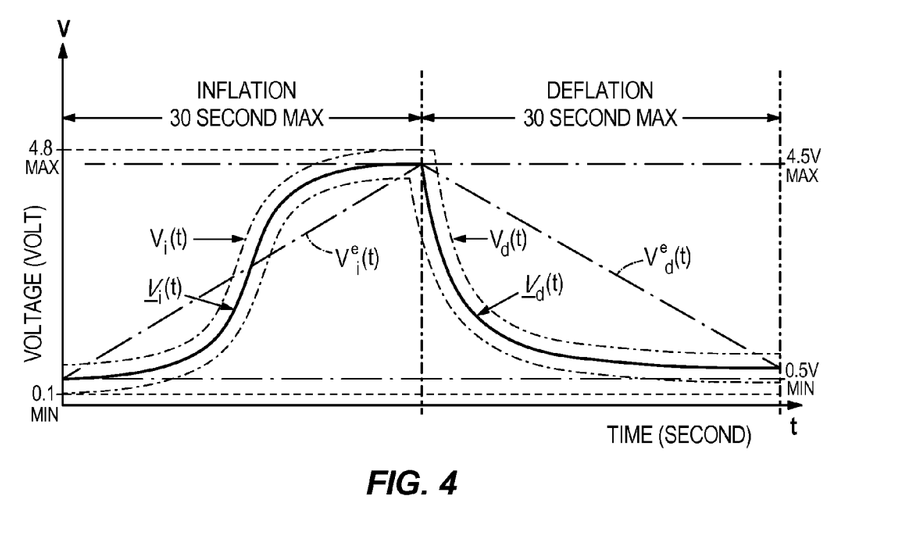
FIG. 4 shows an example of the idealized expected output.

An example of the idealized expected output is shown in FIG. 4. The expected linear output for inflation operation is designated $V^e_d(t)$ and the expected linear output for deflation operation is designated $V^e_d(t)$. For a pneumatic system, the mechanics of inflation and deflation are fundamentally different, which produces very different pressure/voltage vs. time curves for inflation compared to deflation (see, e.g., FIG. 4). Nevertheless, after transforming the respective inflation and deflation curves, the idealized expected inflation output signal function in one embodiment can be represented by the linear function $V^e_i(t)=at+b$ and the idealized expected deflation output signal function in one embodiment can be represented by the linear function $V^e_d(t)=ct+d$.

Figure 5A:
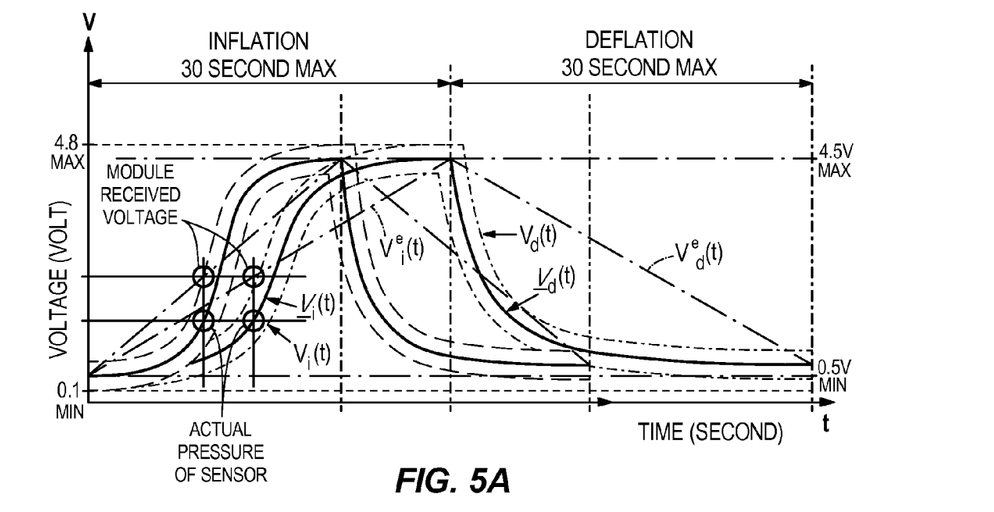
FIG. 5A shows how factors that impact time will affect a linear transfer function during inflation.
Figure 5B:
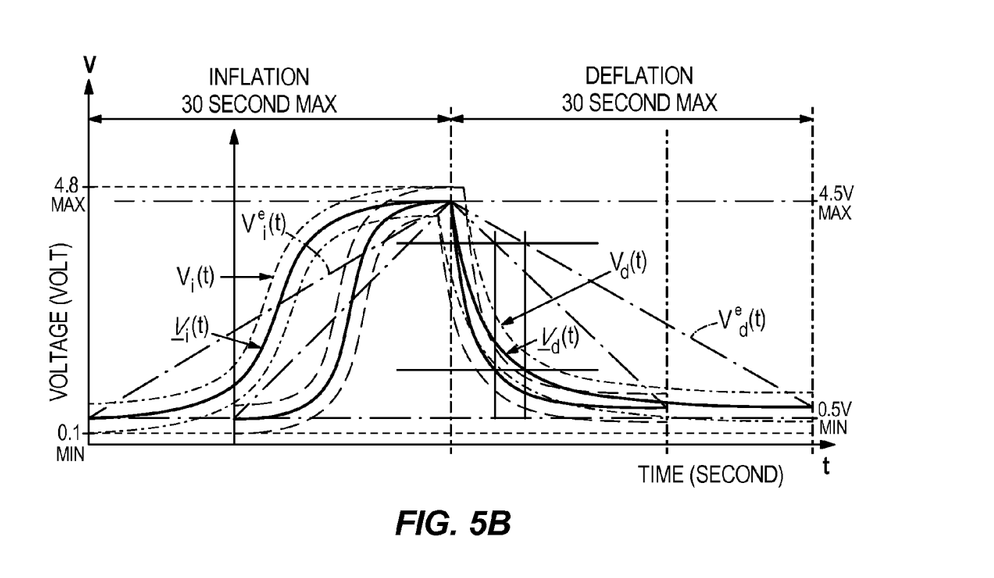
FIG. 5B shows how factors that impact time will affect a linear transfer function during deflation.

System accuracy may be affected by a number of factors. In various embodiments, accuracy of the system is impacted by compensating factors that affect time or system pressure, including applied voltage (e.g. from 9V to 16V), applied load (an unoccupied seat becoming occupied), temperature (extremes or changes), altitude, and the stiffness of trim materials and/or foam in the seat. Most of these factors affect both time and pressure. For example, using a lower voltage to drive the bladder will cause the bladder to inflate and deflate at a slower rate than when a higher driving voltage is used (FIGS. 5A, 5B). Similarly, a static load applied to the seat will slow the rate of inflation of the bladder (FIGS. 5A, 5B). In each case, however, the overall shape of the inflation and deflation curves and the final pressure that is attained are approximately the same, even though the rate of inflation or deflation has changed (FIGS. 5A, 5B).

Accordingly, FIGS. 5A and 5B present an evaluation of how the idealized expected linear output for inflation ($V^e_i(t)$) and deflation ($V^e_d(t)$) could be affected by factors such as the voltage and static load on the seat. Both of these factors would be expected to change the rate at which the lumbar support inflates and deflates. Nevertheless, the shapes of the inflation and deflation curves are expected to remain the same (FIGS. 5A, 5B), as are the starting and ending voltages, and thus the transfer function is expected to retain its accuracy even when these factors change.

For example, FIG. 5A shows how the linear transfer function will translate a given actual pressure sensor voltage reading to a particular voltage that is sent to the control module in the same way even when the rate of inflation is faster or slower. FIG. 5B shows that this is also the case when the rate of deflation is changed.

Figure 6:
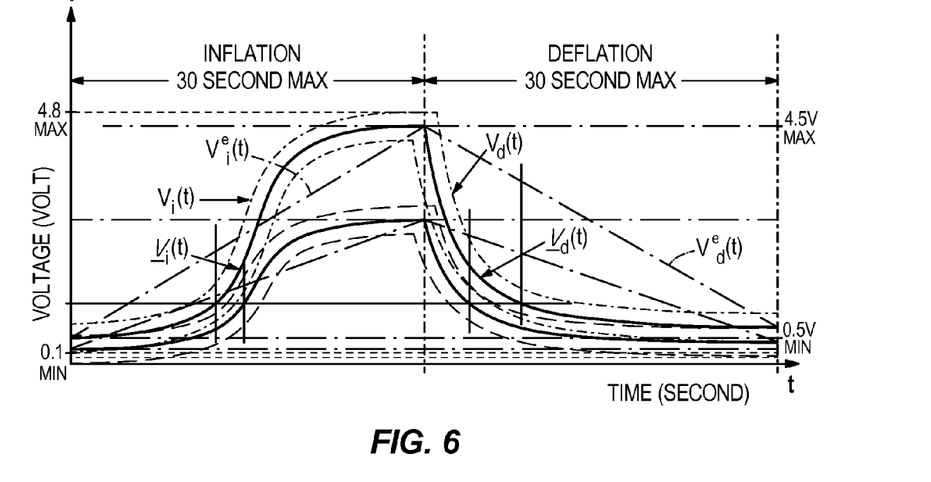
FIG. 6 shows how factors that impact pressure will affect a linear transfer function during inflation and deflation.

FIG. 6 shows the impact on the transfer function of factors that affect pressure output such as dynamic load and temperature. These factors may change the peak pressure (indicated by voltage in the graph of FIG. 6) that is attained while not affecting the time it takes to reach the peak pressure. As shown in FIG. 6, under these conditions the transfer function may translate a given pressure sensor reading (as indicated by voltage) into very different voltages that are reported to the control module. Thus, factors such as these may have a significant impact on the accuracy of the system and the transfer function may introduce errors under these conditions. Understanding the magnitudes of these errors requires extensive evaluation of system behavior under numerous real seat conditions.

Figure 7:
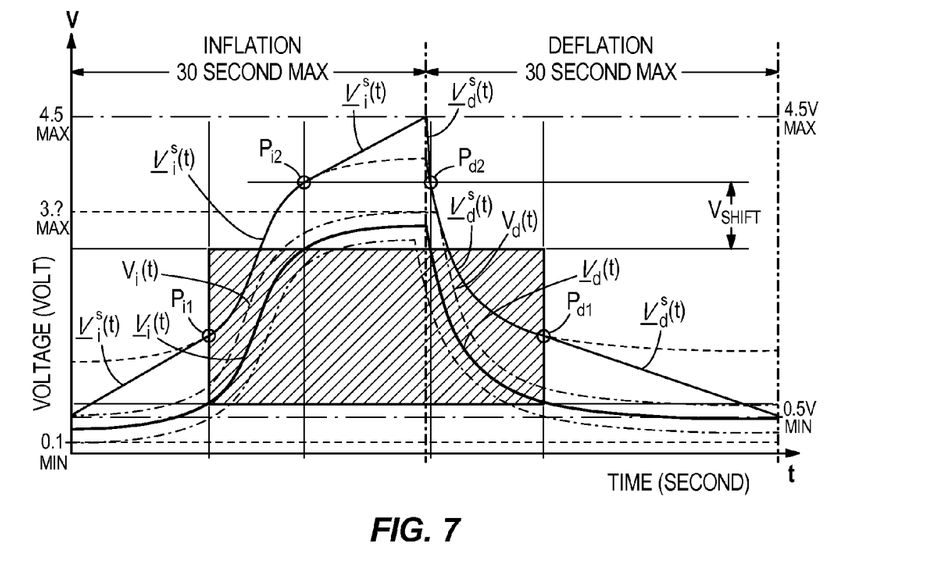
FIG. 7 shows one embodiment of a transfer function in which the inflation and deflation curves have each been divided into three sections.

While in certain embodiments the transfer function is linear through its full range (e.g. FIGS. 4, 5A, 5B, 6), in other embodiments the transfer function may be an approximation of a linear function that is divided into segments, where some segments are linear and others match the actual pressure sensor output (FIG. 7). Accordingly, in one embodiment the transformed inflation output signal function may be divided into three sections as follows:

| | |
|---|---|
| $\underline{V}^s_i(t)=a^1t+b^1$ from the beginning, | (estimate) |
| $\underline{V}^s_i(t)=\underline{V}_i(t)+\alpha$ in the middle, and | (actual pressure sensor output, shifted) |
| $\underline{V}^s_i(t)=a^3t+b^3$ to the end. | (estimate) |

Similarly, in another embodiment the transformed deflation output signal function may be divided into three sections as follows:

| | |
|---|---|
| $\underline{V}^s_d(t)=c^1t+d^1$ from the beginning, | (estimate) |
| $\underline{V}^s_d(t)=\underline{V}_d(t)+\alpha$ in the middle, | and (actual pressure sensor output, shifted) |
| $\underline{V}^s_d(t)=c^3t+d^3$ to the end. | (estimate) |

The shaded area in the graph in FIG. 7 shows the region having the highest degree of accuracy. As part of the process of determining the transfer function, the pressure sensor voltage output may be shifted by an amount designated by $\alpha$, $\underline{V}^{shift}_i(\underline{V}_i(t))$, and/or $\underline{V}^{shift}_d(\underline{V}_d(t))$.

The inflation and deflation sections are demarcated by section separating points $P_{i1}$, $P_{i2}$, $P_{d1}$, and $P_{d2}$. (FIG. 7). In various embodiments, a first inflation separating point $P_{i1}$ corresponds to a point on the inflation curve at which a tangent is approximately equal to a first slope. In one embodiment, the first slope is the slope of a line extending from the minimum voltage (e.g. 0.5 volts) at time t=0 to the tangent of the lower portion of the shifted inflation curve (e.g. see FIG. 7). Similarly, a second inflation separating point $P_{i2}$ corresponds to a point on the inflation curve at which a tangent is approximately equal to a second slope. In one embodiment, the second slope is the slope of a line extending from the maximum pressure sensor voltage output (e.g. 4.5 volts) at a maximum inflation time (e.g. 30 seconds after time t=0) to the tangent of the upper portion of the shifted inflation curve (e.g. see FIG. 7). In various embodiments, the first and second slopes may be approximately equal. Alternatively, the first and second slopes may be independent of one another.

In other embodiments, a first deflation separating point $P_{d1}$ and a second deflation separating point $P_{d2}$ may correspond to points on the shifted deflation curve that have the same voltage as the first ($P_{i1}$) and second ($P_{i2}$) inflation separating points, respectively (FIG. 7).

Figure 8:
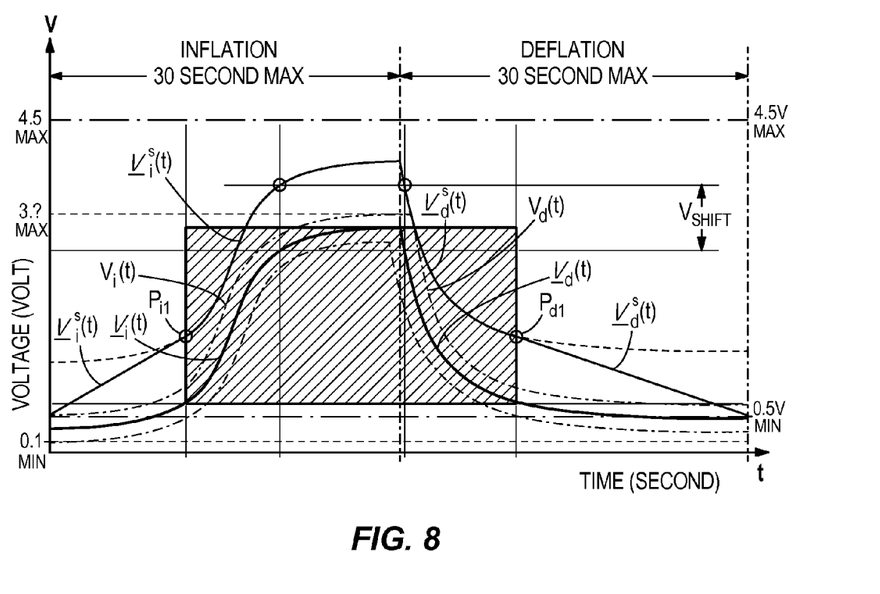
FIG. 8 shows another embodiment of a transfer function in which the inflation and deflation curves have each been divided into two sections.

In some embodiments, it is not necessary to determine the end of the inflation period or the beginning of the deflation period. For example, it may be determined that the bladder will reach its fully-inflated position within a known period of time, e.g. 30 seconds, and thus it can be determined that the bladder has reached its full travel distance (e.g. 35 mm) once this amount of time has elapsed. Hence, in some embodiments the third section of the inflation phase of the transfer function and the first section of the deflation phase of the transfer function may simply correspond to a shifted version of the actual pressure sensor output (FIG. 8). Ultimately, making this assumption (i.e. that the seat will reach a fully inflated or deflated position after a set amount of time) will depend on the seat module action, particularly when the seat position memory is set at more than the full inflation or deflation level.

Accordingly, in some embodiments the third portion of the inflation phase of the transfer function may be expressed as:

$$\underline{V}^s_i(t) = a^3 t + b^3 = \underline{V}_i(t) + \alpha$$

This is the same as the middle section of the inflation phase of the transfer function, as shown above, where the transfer function equals the actual pressure sensor output, shifted by α. After a condition has been reached, for example a period of time has elapsed, then the transfer function transitions to a value designated as $V^{SetValue}$, which in one embodiment is a constant value.

Similarly, in various embodiments the first portion of the deflation phase of the transfer function may be expressed as:

$$\underline{V}^s_d(t) = c^3 t + d^3 = \underline{V}_d(t) + \alpha$$

This is the same as the middle section of the deflation phase of the transfer function, as discussed above, where the transfer function equals the actual pressure sensor output, shifted by α. In some embodiments, the initial value of the transfer function at the start of the inflation phase may equal the constant $V^{SetValue}$, as discussed above.

In various embodiments, the controller that is implementing the transformation algorithm (e.g. a controller which includes a transfer function algorithm) will store one or more pieces of information regarding the status of the most recent operation, including, for example:

which operation was last being performed (inflation or deflation);
the section separating points $P_{i1}$, $P_{d1}$, and $P_{d2}$;
which section the transfer function was last in (beginning or middle or end);
the last data $\underline{V}^s_i(t)$ and $\underline{V}^s_d(t)$ sent to the seat module controller and its sensor output $\underline{V}_i(t)$ and $\underline{V}_d(t)$; and
the shift α, $\underline{V}^{shift}_i(\underline{V}_i(t))$, and $\underline{V}^{shift}_d(\underline{V}_d(t))$.

By storing this information the controller can then resume operation of the bladder (by either inflating or deflating the bladder) using the correct parameters for the transfer function.

In various embodiments, the linearization transfer function can be summarized as follows:

For the first point in the inflation phase, the transformed output feed may be expressed as: $\underline{V}_i(0) + \underline{V}^{shift}_i(\underline{V}_i(0))$;

For the second point and after but before middle section in the inflation phase, the transformed output may be expressed as:

$\underline{V}_i(t) + \underline{V}^{shift}_i(\underline{V}_i(t))$, if the real time actual inflation tangent is larger than the minimum inflation tangent $a^1$;
$\underline{V}^e_i(t) + \underline{V}^{shift}_i(\underline{V}^e_i(t))$, if the real time actual inflation tangent is less than or equal to the minimum inflation tangent $a^1$;
$\underline{V}^e_i(n) + \underline{V}^{shift}_i(\underline{V}^e_i(n))$, in the last point before middle section where n is the last point.

For the middle and/or end section in the inflation phase, the transformed output may be expressed as $\underline{V}_i(t) + \alpha$, where $\underline{V}_i(n) + \alpha$ shall equal to $\underline{V}^e_i(n) + \underline{V}^{shift}_i(\underline{V}^e_i(n))$ and n is the last point in the beginning section.

For the first point and after but before the end section in the deflation phase, the transformed output may be expressed as $\underline{V}_d(t) + \alpha$.

For the end section in the deflation phase, the transformed output may be expressed as:

$\underline{V}_d(t_m) + \underline{V}^{shift}_d(\underline{V}_d(t_m))$ for the first point of the end section where α=shall equal to $\underline{V}^{shift}_d(\underline{V}_d(t_m))$ and $t_m$ is the first point of the end section;
$\underline{V}_d(t) + \underline{V}^{shift}_d(\underline{V}_d(t))$ if the slope of the real time actual deflation tangent is less than the slope of the minimum deflation tangent $c^3$;
$\underline{V}^e_d(t) + \underline{V}^{shift}_d(\underline{V}_d(t))$ if the slope of the real time actual deflation tangent is larger than or equal to the slope of the minimum deflation tangent $c^3$.

In various embodiments, the section separating points $P_{i1}$, $P_{i2}$, $P_{d1}$, and $P_{d2}$ may be determined empirically using actual seat test results and may be affected by the transfer function algorithm with which they are used.

In other embodiments, the shift $V^{shift}_i(\underline{V}_i(t))$ in the beginning section of inflation, $V^{shift}_d(\underline{V}_d(t))$ in the end section of deflation, and value α may be determined empirically using actual seat test results and may be affected by the transfer function algorithm with which they are used.

In still other embodiments, the algorithms to generate $\underline{V}^s_i(t) = a^1 t + b^1$ and $\underline{V}^s_d(t) = c^1 t + d^1$ may be determined empirically using actual seat test results.

In yet other embodiments, the algorithms to smoothly transition from $\underline{V}^s_i(t) = a^1 t + b^1$ to $\underline{V}_i(t) + \alpha$ or from $\underline{V}_d(t) + \alpha$ to $\underline{V}^s_d(t) = c^3 t + d^3$ may be determined empirically using actual seat test results and may be affected by the transfer function algorithm with which they are used.

In other embodiments, a real time "moving average" algorithm which has been optimized for use with $V_i(t)$ and $V_d(t)$ and the transfer function algorithm may be used in real time to smooth the actual signal.

In various embodiments, a real time tangent estimation algorithm which has been optimized for use with $V_i(t)$ and $V_d(t)$ and the transfer function algorithm may be used in real time to estimate the section separating points $P_{i1}$, $P_{i2}$, $P_{d1}$, and $P_{d2}$.

In one embodiment, the following procedures are used to develop an algorithm for a given combination of seat and bladder components. The development of the algorithm is based on a number of assumptions with regard to the performance of the bladder, including:

the seat bladder displacement over time is approximately linear during inflation;
the seat bladder displacement over time is approximately linear during deflation if there is a sufficient load applied onto the bladder;
the seat bladder displacement over time is approximate linear in deflation if the pressure remaining in the bladder is higher than approximately 1 kPa;
the bladder air volume over time is approximately proportional to the bladder displacement over time;
the integral of the bladder air flow rate over time is approximately proportional to the bladder air volume over time; and
the bladder air flow rate depends on the bladder pressure.

Thus, the linearized output curve of bladder displacement over time can be generated or estimated based on bladder pressure. Furthermore, additional optimization algorithms can be incorporated, for example algorithms utilizing related physical phenomena and environment conditions (such as temperature, power supply voltage, etc.) to fit requirements of a particular application.

Figure 9:
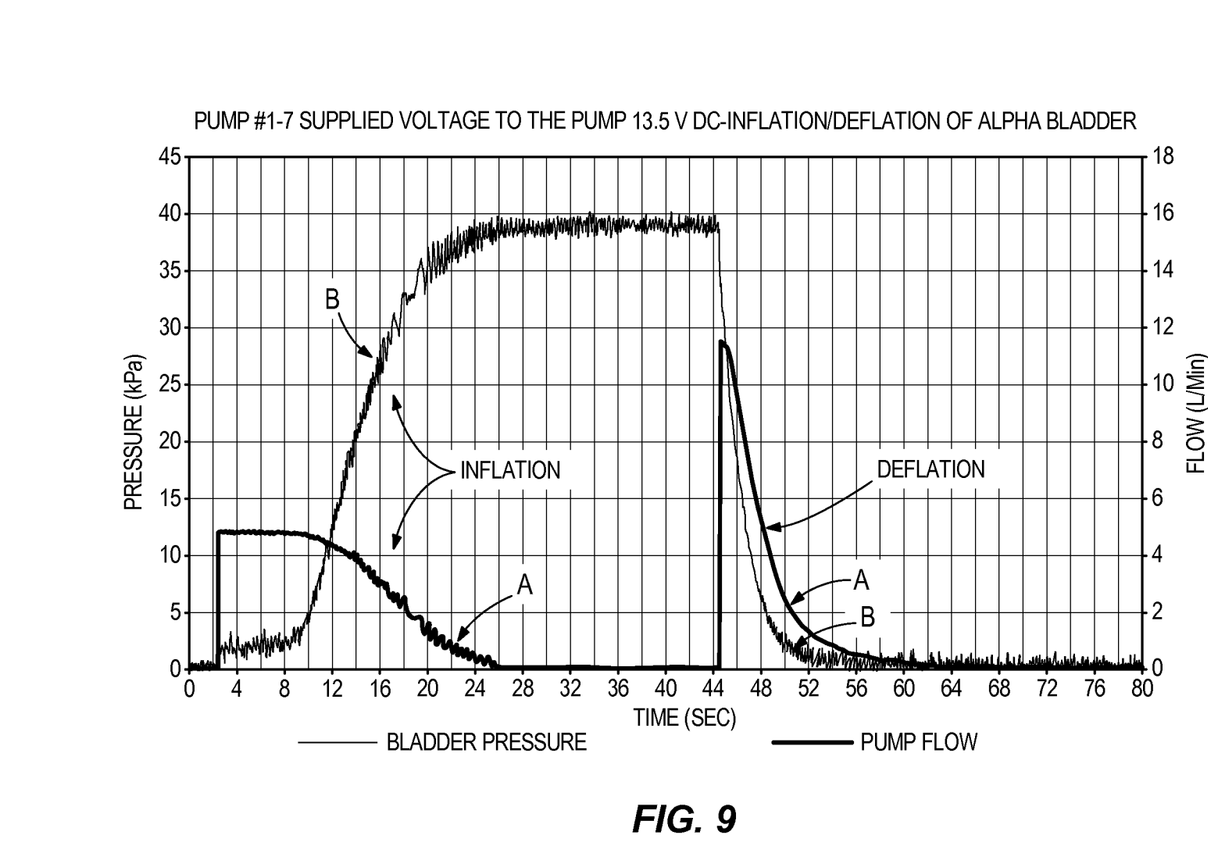
FIG. 9 shows the results of simultaneous measurements of seat bladder air flow rate vs. time and pressure vs. time.

FIG. 9 shows the results of simultaneous measurements of seat bladder air flow rate (curve A) vs. time and pressure (curve B) vs. time. The graph in FIG. 9 covers a period of time including an inflation phase (from 0 to about 44 seconds) and a deflation phase (from about 44 seconds to 80 seconds).

Figure 10:
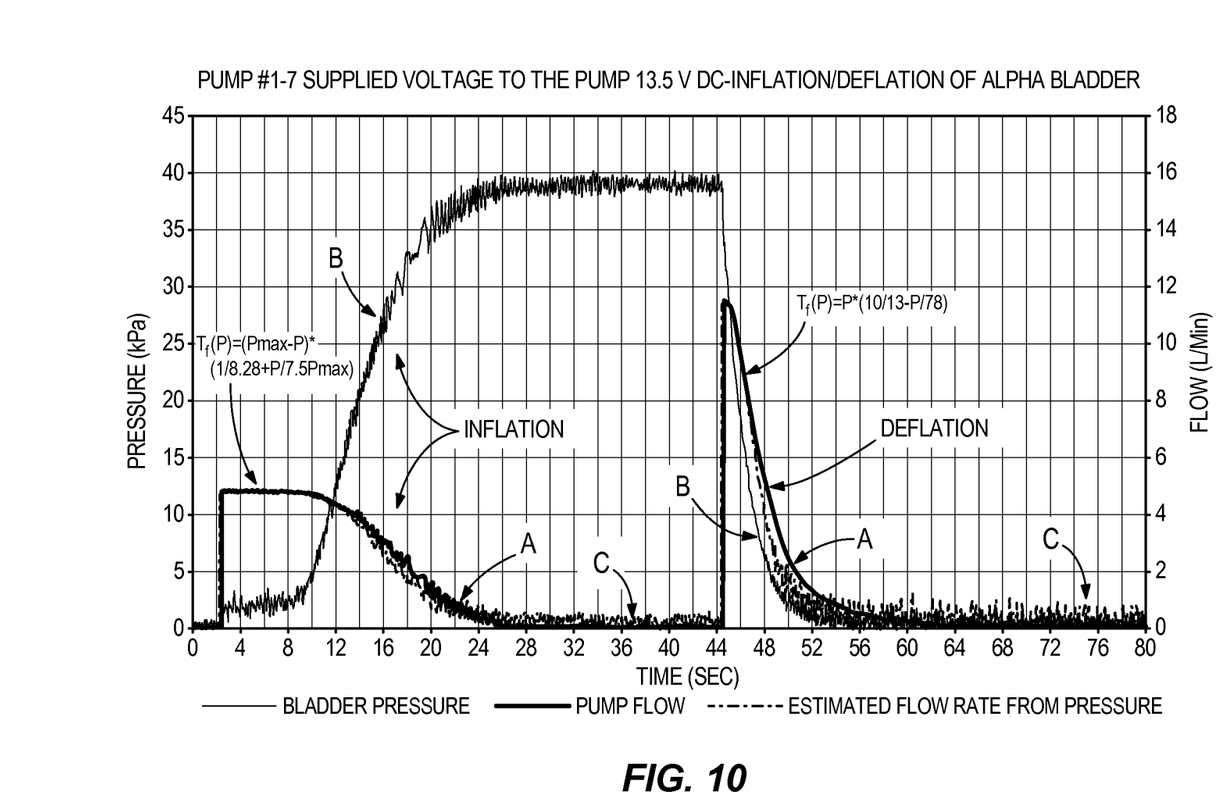
FIG. 10 shows the results of estimating a transfer relation equation $T_f(P)$ from seat bladder air pressure to flow rate.

FIG. 10 shows the results of estimating a transfer relation equation $T_f(P)$ from seat bladder air pressure to flow rate. A curve is fitted onto the flow rate (curve A) during the inflation phase using the relationship:

$$T_f(P)=(P_{max}-P)*(1/8.28+P/7.5P_{max}) \qquad (1)$$

A separate curve is fitted onto the flow rate during the deflation phase using the relationship:

$$T_f(P)=P*(10/13-P/78) \qquad (2)$$

The fitted curves are designated curve C in FIG. 10.

Figure 11:
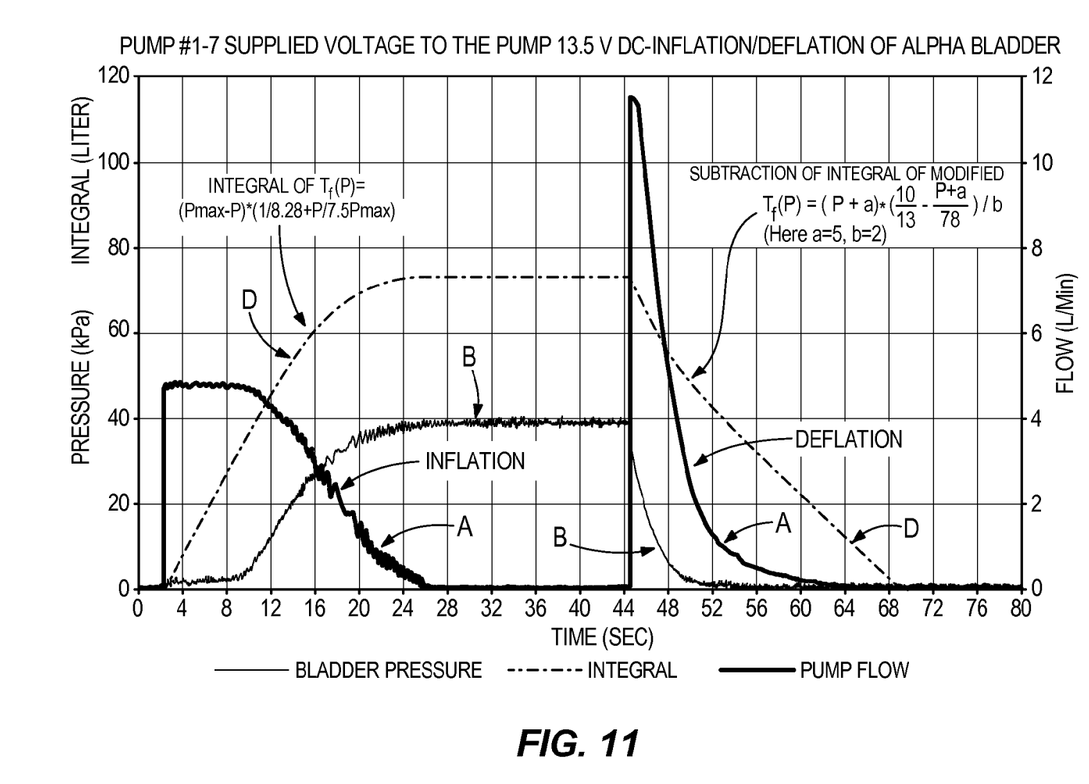
FIG. 11 shows curves A and B as in FIG. 9 along with curve D, which represents an approximately linear pressure/displacement transfer function.

FIG. 11 shows curves A and B (as in FIG. 9) along with curve D, which represents an approximately linear pressure/displacement transfer function. During the inflation phase, curve D is calculated through the integration of equation (1). During the deflation phase, the following modified version of equation (2) is subtracted from the inflation phase portion of curve D:

$$T_f(P)=(P+a)*(10/13-(P+a)/78)/b \qquad (3)$$

where a=5 and b=2 in the graph of FIG. 11.

Figure 12:
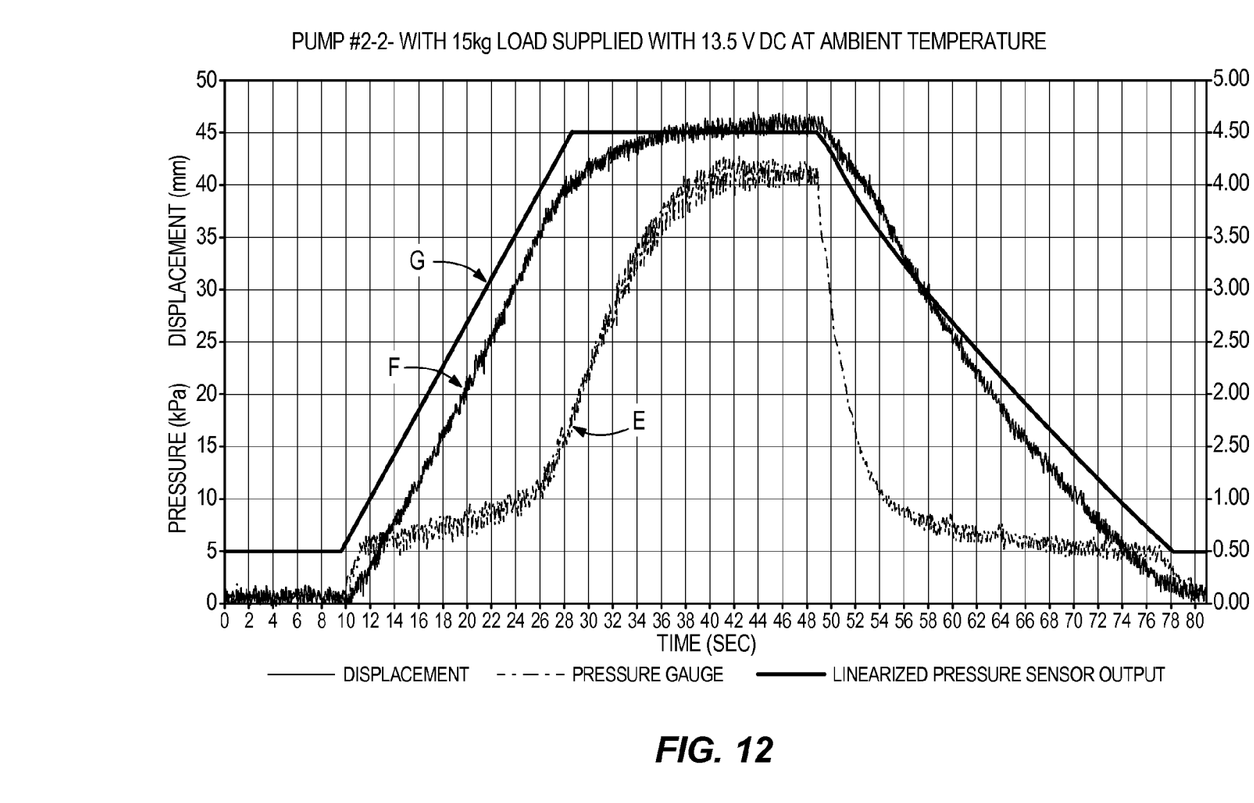
FIG. 12 shows simultaneous measurement of seat bladder air pressure (curve E) vs. time and displacement (curve F) vs. time as well as a linearized pressure/displacement curve (curve G).

FIG. 12 shows simultaneous measurement of seat bladder air pressure (curve E) vs. time and displacement (curve F) vs. time as well as a linearized pressure/displacement curve (curve G), determined on a seat with a 15 kilogram load applied thereto. Curve G is determined as described above for curve D in FIG. 11, where the constants $P_{max}$, a, and b are adjusted so that the linearized pressure/displacement curve (curve G) is similar to the displacement curve (curve F).

Figure 13:
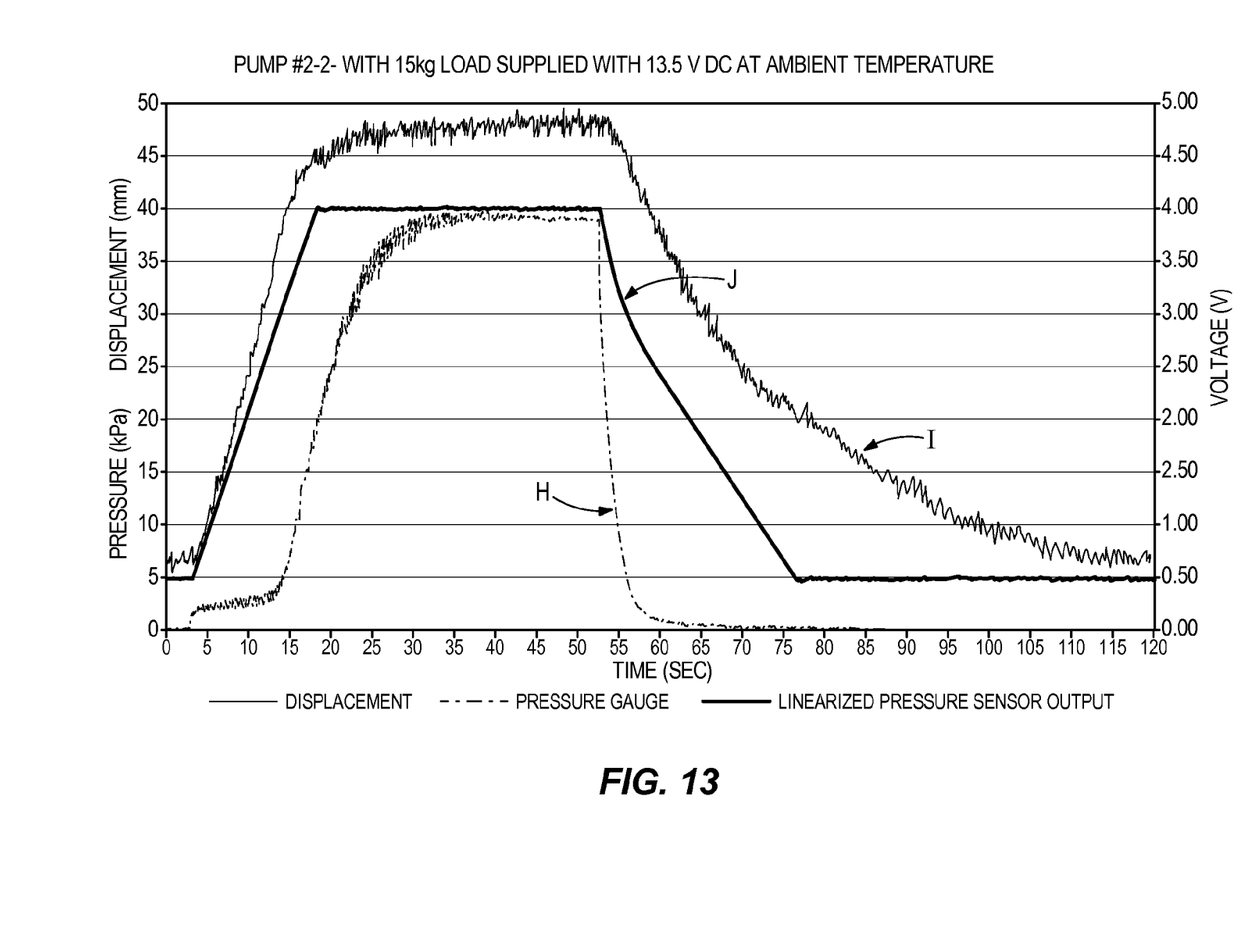
FIG. 13 shows simultaneous measurement of seat bladder air pressure (curve H) vs. time and displacement (curve I) vs. time compared to a linearized pressure/displacement curve (curve J).

FIG. 13 shows simultaneous measurement of seat bladder air pressure (curve H) vs. time and displacement (curve I) vs. time compared to a linearized pressure/displacement curve (curve J), determined on a seat with a 1.5 kilogram load applied thereto. As mentioned above, the constants $P_{max}$, a, and b are adjusted to make the linearized pressure/displacement curve (curve J) similar to the displacement curve (curve I). In addition, an optimization algorithm may be applied so that the integral (linearized pressure/displacement) curve is as linear and as close to the displacement curve as possible within the deflation time limitation, even when there is an insufficient load applied to the bladder as in this case.

As mentioned above, when adjusting constant $P_{max}$, a, and b, it may be advantageous to apply an optimization algorithm so that a voltage in the integral (linearized pressure/displacement) curve represents approximately the same pressure in both the inflation and deflation phases. One approach to optimization is to use the sectional linearization algorithm (SLA) approach that is disclosed above in FIGS. 1-8 and accompanying text can be used to determine the initial values of $P_{max}$, a, and b. Furthermore, there are constraints regarding the values of the constants $P_{max}$, a, and b, meaning that these variables are constrained to be within a specific range. One way to define the constraints of the constants $P_{max}$, a, and b is using the SLA algorithm which is presented above.

Thus, two types of estimation algorithms have been developed: a direct algorithm to transfer a nonlinear pressure curve to a linear curve, which is implemented as the Sectional Linearization Algorithm (SLA) shown in FIGS. 1-8 and accompanying text, and an indirect algorithm as shown in FIGS. 9-13 and accompanying text.

Thus, the invention provides, among other things, an apparatus, system, and method for operating a pneumatic lumbar support between a deflated position and an inflated position. Various features and advantages of the invention are set forth in the following claims.

What is claimed is:

1. A method for operating a pneumatic lumbar support between a deflated position and an inflated position, comprising:
    inflating a bladder of the pneumatic lumbar support;
    sensing a pressure within the bladder using a pressure sensor;
    producing an inflation output signal from the pressure sensor, wherein the inflation output signal is a function of time;
    converting the inflation output signal using an inflation-deflation transfer function, wherein at least a portion of the inflation-deflation transfer function converts a nonlinear portion of the inflation output signal to a linear function; and
    adjusting displacement of the bladder based on the converted inflation output signal.

2. The method of claim 1, further comprising:
    deflating the bladder of the pneumatic lumbar support;
    sensing the pressure within the bladder using the pressure sensor;
    producing a deflation output signal from the pressure sensor, wherein the deflation output signal is a function of time;
    converting the deflation output signal using the inflation-deflation transfer function, wherein at least a portion of the inflation-deflation transfer function converts a nonlinear portion of the deflation output signal to a linear function; and
    adjusting displacement of the bladder based on the converted deflation output signal.

3. The method of claim 1, wherein,
    from the deflated position to a first inflation separating point, the inflation-deflation transfer function comprises a linear function;
    from the first inflation separating point to a second inflation separating point, the inflation-deflation transfer function comprises the inflation output signal of the pressure sensor; and
    from the second inflation separating point to the inflated position, the inflation-deflation transfer function comprises a linear function.

4. The method of claim 2, wherein,
    from the inflated position to a first deflation separating point, the inflation-deflation transfer function comprises a linear function;
    from the first deflation separating point to a second deflation separating point, the inflation-deflation transfer function comprises the deflation output signal of the pressure sensor; and
    from the second deflation separating point to the deflated position, the inflation-deflation transfer function comprises a linear function.

5. The method of claim 3, wherein, from the first inflation separating point to a second inflation separating point, the inflation-deflation transfer function equals the inflation output signal of the pressure sensor plus a shift factor.

6. The method of claim 4, wherein, from the first deflation separating point to a second deflation separating point, the inflation-deflation transfer function equals the deflation output signal of the pressure sensor plus a shift factor.

7. The method of claim 3, wherein the first inflation separating point comprises a point corresponding to a first tangent on a curve of the inflation output signal, wherein the first tangent has a first slope value.

8. The method of claim 7, wherein the second inflation separating point comprises a point corresponding to a second tangent on a curve of the inflation output signal, wherein the second tangent has a second slope value.

9. The method of claim 8, wherein the first slope value is approximately equal to the second slope value.

10. The method of claim 4, wherein the first deflation separating point comprises a point corresponding to a third tangent on a curve of the inflation output signal, wherein the third tangent has a third slope value.

11. The method of claim 10, wherein the second deflation separating point comprises a point corresponding to a fourth tangent on a curve of the inflation output signal, wherein the fourth tangent has a fourth slope value.

12. The method of claim 1, wherein the bladder is housed within a vehicle seat.

13. The method of claim 2, wherein the inflation-deflation transfer function is determined by
  determining a flow rate transfer function using the pressure within the bladder to estimate a flow rate;
  determining at least one of a linearized output pressure and a linearized displacement from the bladder pressure using the flow rate transfer function; and
  adjusting the flow rate transfer function to produce the inflation-deflation transfer function.

14. The method of claim 13, wherein adjusting the flow rate transfer function comprises adjusting the flow rate transfer function to produce the inflation-deflation transfer function such that the inflation-deflation transfer function output is approximately the same during inflation and deflation when the pressure within the bladder is the same.

15. A system for operating a pneumatic lumbar support between a deflated position and an inflated position comprising:
  a seat;
  an inflatable bladder associated with the seat;
  an inflation device for inflating and deflating the inflatable bladder;
  a pressure sensor for measuring pressure within the inflatable bladder; and
  a controller in communication with the inflation device and the pressure sensor, the controller configured to perform the method of claim 1.

16. A method for operating a pneumatic lumbar support between a deflated position and an inflated position, comprising:
  inflating a bladder of the pneumatic lumbar support;
  sensing a pressure within the bladder using a pressure sensor;
  producing an inflation output signal from the pressure sensor, wherein the inflation output signal is a function of time;
  converting the inflation output signal using an inflation-deflation transfer function; and
  adjusting a rate of inflation based on the converted inflation output signal, wherein
    from the deflated position to a first inflation separating point, the inflation-deflation transfer function comprises a linear function;
    from the first inflation separating point to a second inflation separating point, the inflation-deflation transfer function comprises the inflation output signal of the pressure sensor; and
    from the second inflation separating point to the inflated position, the inflation-deflation transfer function comprises a linear function.

17. The method of claim 16, further comprising:
  deflating the bladder of the pneumatic lumbar support;
  sensing the pressure within the bladder using the pressure sensor;
  producing a deflation output signal from the pressure sensor, wherein the deflation output signal is a function of time;
  converting the deflation output signal using the inflation-deflation transfer function; and
  adjusting a rate of deflation based on the converted deflation output signal, wherein
    from the inflated position to a first deflation separating point, the inflation-deflation transfer function comprises a linear function;
    from the first deflation separating point to a second deflation separating point, the inflation-deflation transfer function comprises the deflation output signal of the pressure sensor; and
    from the second deflation separating point to the deflated position, the inflation-deflation transfer function comprises a linear function.

18. A method for operating a pneumatic lumbar support between a deflated position and an inflated position, comprising:
  inflating a bladder of the pneumatic lumbar support;
  sensing a pressure within the bladder using a pressure sensor;
  producing an inflation output signal from the pressure sensor, wherein the inflation output signal is a function of time;
  converting the inflation output signal using an inflation-deflation transfer function;
  adjusting a rate of inflation based on the converted inflation output signal, deflating the bladder of the pneumatic lumbar support;
  sensing the pressure within the bladder using the pressure sensor;
  producing a deflation output signal from the pressure sensor, wherein the deflation output signal is a function of time;
  converting the deflation output signal using the inflation-deflation transfer function;
  adjusting a rate of deflation based on the converted deflation output signal;
  wherein the inflation-deflation transfer function is determined by determining a flow rate transfer function using the pressure within the bladder to estimate a flow rate;
  determining at least one of a linearized output pressure and a linearized displacement from the bladder pressure using the flow rate transfer function; and
  adjusting the flow rate transfer function to produce the inflation-deflation transfer function.

19. The method of claim 18, wherein adjusting the flow rate transfer function comprises adjusting the flow rate transfer function to produce the inflation-deflation transfer function such that the inflation-deflation transfer function output is approximately the same during inflation and deflation when the pressure within the bladder is the same.

20. The method of claim 18, wherein the bladder is housed within a vehicle seat.

* * * * *